United States Patent
Senew

(10) Patent No.: US 10,299,007 B2
(45) Date of Patent: May 21, 2019

(54) APPARATUS AND METHOD FOR DISPLAYING VIDEO

(71) Applicant: John Senew, Park City, UT (US)

(72) Inventor: John Senew, Park City, UT (US)

(73) Assignee: John Senew, Park City, UT (US)

( * ) Notice: Subject to any disclaimer, the term of this patent is extended or adjusted under 35 U.S.C. 154(b) by 0 days.

(21) Appl. No.: 15/611,562

(22) Filed: Jun. 1, 2017

(65) Prior Publication Data

US 2017/0353758 A1 Dec. 7, 2017

Related U.S. Application Data

(60) Provisional application No. 62/344,492, filed on Jun. 2, 2016.

(51) Int. Cl.
| | | |
|---|---|---|
| *H04N 21/485* | (2011.01) | |
| *H04N 21/81* | (2011.01) | |
| *H04N 21/488* | (2011.01) | |
| *H04N 21/44* | (2011.01) | |
| *H04N 21/431* | (2011.01) | |
| *H04N 21/41* | (2011.01) | |

(52) U.S. Cl.
CPC ..... *H04N 21/4858* (2013.01); *H04N 21/4126* (2013.01); *H04N 21/4316* (2013.01); *H04N 21/44008* (2013.01); *H04N 21/488* (2013.01); *H04N 21/8126* (2013.01); *H04N 21/8133* (2013.01)

(58) Field of Classification Search
CPC ........... H04N 21/4383; H04N 21/4126; H04N 21/4858; H04N 21/6118; H04N 21/6143; H04N 21/8126; H04N 21/4532; H04N 21/4312; H04N 21/4667; H04N 21/4882; H04N 21/4316; H04N 21/44008; H04N 21/47214; H04N 21/488; H04N 21/4886; H04N 5/44591

See application file for complete search history.

(56) References Cited

U.S. PATENT DOCUMENTS

| | | |
|---|---|---|
| 6,193,610 B1 | 2/2001 | Junkin |
| 7,577,978 B1 | 8/2009 | Wistendahl et al. |
| 8,683,502 B2 | 3/2014 | Shkedi et al. |
| 8,891,939 B2 | 11/2014 | Alexandrov et al. |
| 9,615,124 B1 * | 4/2017 | Gupta ................ H04N 21/4312 |
| 9,641,989 B1 | 5/2017 | Dietrich et al. |
| 2002/0129364 A1 | 9/2002 | Smith et al. |

(Continued)

*Primary Examiner* — Benjamin R Bruckart
*Assistant Examiner* — Tien M Nguyen
(74) *Attorney, Agent, or Firm* — Kunzler Bean & Adamson

(57) ABSTRACT

Apparatuses, methods, and program products are disclosed for displaying video. One method includes receiving a video input at a first port of an electronic device. The method includes receiving, at the electronic device, an indication to switch a video output between a first mode and a second mode. The first mode includes the video input occupying a full display screen, and the second mode includes the video input occupying less than the full display screen. The method includes receiving, at the electronic device, information corresponding to the video input. In the second mode, the information occupies a portion of the full display screen. The method includes transmitting, from a second port of the electronic device, the video output for displaying the video output on a display external to the electronic device.

11 Claims, 7 Drawing Sheets

(56) References Cited

U.S. PATENT DOCUMENTS

| | | |
|---|---|---|
| 2003/0084456 A1 | 5/2003 | Ryan et al. |
| 2004/0107439 A1* | 6/2004 | Hassell .............. H04N 5/44591 |
| | | 725/44 |
| 2006/0050790 A1 | 3/2006 | Eerenberg et al. |
| 2007/0028272 A1 | 2/2007 | Lockton |
| 2008/0196071 A1 | 8/2008 | Manthoulis |
| 2010/0115559 A1* | 5/2010 | Ellis .................. H04N 5/44543 |
| | | 725/53 |
| 2011/0197242 A1 | 8/2011 | Koplar |
| 2012/0151516 A1 | 6/2012 | Yanko |
| 2013/0107119 A1 | 5/2013 | Chang et al. |
| 2013/0312027 A1 | 11/2013 | Baumel et al. |
| 2014/0011587 A1 | 1/2014 | Hughes et al. |
| 2015/0127775 A1* | 5/2015 | Munagala ............. H04L 65/601 |
| | | 709/219 |
| 2015/0128163 A1 | 5/2015 | Cormican et al. |
| 2015/0143262 A1 | 5/2015 | Norwood et al. |
| 2017/0105040 A1 | 4/2017 | Gao et al. |
| 2017/0111595 A1 | 4/2017 | Soni et al. |

* cited by examiner

APPARATUS AND METHOD FOR DISPLAYING VIDEO

CROSS-REFERENCES TO RELATED APPLICATIONS

This application claims priority to U.S. Provisional Patent Application No. 62/344,492 entitled "Digital Devices Interacting with Live TV Sports Broadcast" and filed on Jun. 2, 2016 for John Senew which is incorporated herein by reference in its entirety.

BACKGROUND

Field

The subject matter disclosed herein relates to displaying video and more particularly relates to displaying video in different modes.

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions. Performing various actions, such as displaying video, may be difficult to perform in conjunction with displaying user data.

BRIEF SUMMARY

An apparatus for displaying video is disclosed. A method and computer program product also perform the functions of the apparatus. In one embodiment, the method includes receiving a video input at a first port of an electronic device. In certain embodiments, the method includes receiving, at the electronic device, an indication to switch a video output between a first mode and a second mode. In such embodiments, the first mode includes the video input occupying a full display screen, and the second mode includes the video input occupying less than the full display screen. In some embodiments, the method includes receiving, at the electronic device, information corresponding to the video input. In various embodiments, in the second mode, the information occupies a portion of the full display screen. In some embodiments, the method includes transmitting, from a second port of the electronic device, the video output for displaying the video output on a display external to the electronic device.

In some embodiments, the video input includes a video output from a cable box or a satellite box. In one embodiment, the video input includes a sporting event. In certain embodiments, the indication indicates to switch to the first mode in response to the sporting event having a high action level. In various embodiments, the high action level includes a time in which a sport apparatus is in play, a time in which the sport apparatus is in motion, a time in which a player is in motion, a time in which a game clock is running, a time not in a huddle, or some combination thereof. In some embodiments, the indication indicates to switch to the second mode in response to the sporting event having a low action level. In one embodiment, the low action level includes a timeout, a time in which a sport apparatus is not in play, a time in which a player is not in motion, a penalty time, a clock stopping event, an injury break, a commercial break, a delay of game, a time in a huddle, or some combination thereof.

In various embodiments, in the second mode, the video input occupies a first portion of the full display screen, the information occupies a second portion of the full display screen, and an advertisement occupies a third portion of the full display screen. In some embodiments, the method includes receiving, at the electronic device, the advertisement. In certain embodiments, the information includes a user's prediction of an outcome of a sporting event, a user's prediction of a play of a sporting event, a user's prediction of a score of a sporting event, a user's selection, a user's ranking, a user's score, a question, a response, or some combination thereof.

An electronic device for displaying video, in one embodiment, includes a first port, a second port, a processor, and a memory. In certain embodiments, the memory stores code executable by the processor to: receive a video input at the first port; receive an indication to switch a video output between a first mode and a second mode, wherein the first mode includes the video input occupying a full display screen, and the second mode includes the video input occupying less than the full display screen; receive information corresponding to the video input, wherein, in the second mode, the information occupies a portion of the full display screen; and transmit, from the second port, the video output for displaying the video output on a display external to the electronic device.

In some embodiments, the video input includes a video output from a cable box or a satellite box. In various embodiments, the video input includes a sporting event. In one embodiment, in the second mode, the video input occupies a first portion of the full display screen, the information occupies a second portion of the full display screen, and an advertisement occupies a third portion of the full display screen. In certain embodiments, the information includes a user's prediction of an outcome of a sporting event, a user's prediction of a play of a sporting event, a user's prediction of a score of a sporting event, a user's selection, a user's ranking, a user's score, a question, a response, or some combination thereof.

A method for displaying video, in one embodiment, includes transmitting, to an electronic device, an indication to switch a video output between a first mode and a second mode. In certain embodiments, the first mode includes a video input occupying a full display screen, and the second mode includes the video input occupying less than the full display screen. In various embodiments, the method includes transmitting, to the electronic device, information corresponding to the video input. In some embodiments, in the second mode, the information occupies a portion of the full display screen.

In certain embodiments, the video input includes a video output from a cable box or a satellite box. In some embodiments, the video input includes a sporting event. In various embodiments, the indication indicates to switch to the first mode in response to the sporting event having a high action level. In one embodiment, the indication indicates to switch to the second mode in response to the sporting event having a low action level.

BRIEF DESCRIPTION OF THE DRAWINGS

A more particular description of the embodiments briefly described above will be rendered by reference to specific embodiments that are illustrated in the appended drawings.

Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
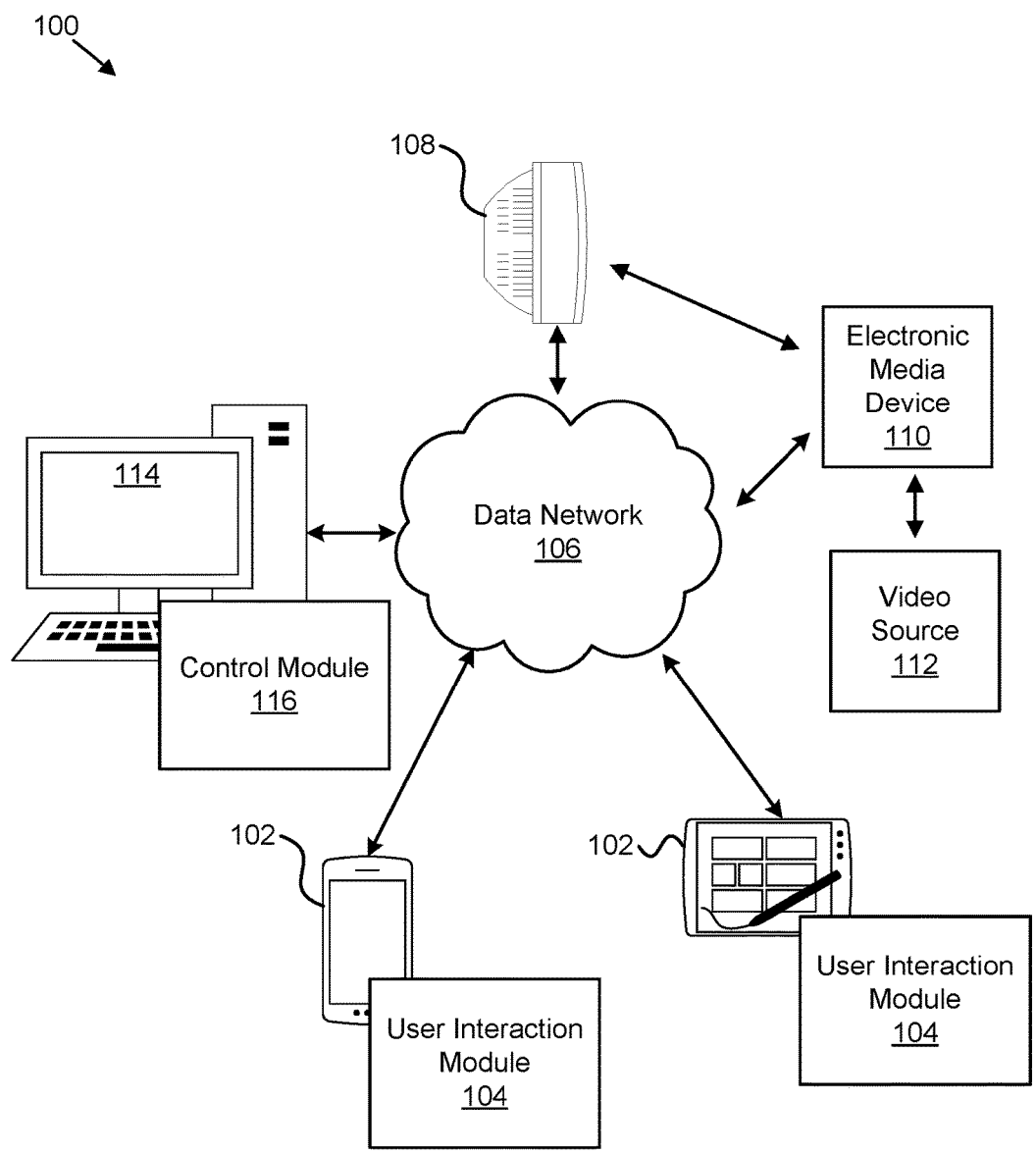
FIG. 1 is a schematic block diagram illustrating one embodiment of a system for displaying video.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for displaying video. In one embodiment, the system 100 includes information handling devices 102, user interaction modules 104, data networks 106, display devices 108, electronic media devices 110, video sources 112, information handling devices 114, and control modules 116. Even though a specific number of information handling devices 102, user interaction modules 104, data networks 106, display devices 108, electronic media devices 110, video sources 112, information handling devices 114, and control modules 116 are depicted in FIG. 1, one of skill in the art will recognize that any number of information handling devices 102, user interaction modules 104, data networks 106, display devices 108, electronic media devices 110, video sources 112, information handling devices 114, and control modules 116 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, vehicle on-board computers, streaming devices, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the user interaction module 104. In certain embodiments, the user interaction module 104 may receive interactive options that facilitate user selection so that the user can predict what will happen on the video source. Moreover, in some embodiments, the user interaction module 104 may display the interactive options, receive selections from the user, and/or transmit the user selections to the display device 108, the electronic media device 110, the video source, and/or the information handling device 114. For example, in one embodiment, the user interaction module 104 may receive interactive options corresponding to a sporting event. The interactive options may enable a user to predict what will happen in the sporting event before it occurs. Moreover, the interactive options may enable the user to compete with other users in real-time during the sporting event. In some embodiments, the user interaction module 104 may include a game application that enables users to predict what will happen in a sporting event during a low level action prior to high level action occurring. In this manner, the user interaction module 104 may facilitate user interaction with the video source 112.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the Internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

The display device 108 may be used to display video from a video source (e.g., a live event), information from one or more user interaction modules 104, advertisements, and/or other information. In one embodiment, the display device 108 may switch between different modes in which different things are displayed. For example, in a first mode, the display device 108 may display the live event on an entire screen of the display device 108. In one embodiment, the first mode may be used during non-competitive action of a sporting event (e.g., low action level). As another example, in a second mode, the display device 108 may display the live event on a first portion of the screen of the display device 108, information from the one or more user interaction modules 104 on a second portion of the screen of the display device 108, and advertisements (or other information) on a third portion of the screen of the display device 108. In certain embodiments, the second mode may be used during competitive action of a sporting event (e.g., high action level, a time in which participants or teams are actively engaged in a sporting event).

A high action level may include a variety of different scenarios. In one embodiment involving a timed event (e.g., an event that includes a clock or timer), from a time at which a timer starts to a time at which the timer stops, the participants or teams may be actively competing against other participants or teams in a high action level. In certain embodiments not involving a timed event (e.g., an event that does not include a clock or timer), an official of a sporting event may signal to participants or teams a time at which to start and/or a time at which to stop competing against other participants or teams in a high action level. In further embodiments not involving a timed event, participants or teams may initiate a time at which competition starts and/or stops. For example, in tennis, a server may approach a base line with a tennis ball to begin a high action level. The high action level may end at a time in which a participant or team wins a point. In additional embodiments not involving a timed event, such as golf, a golfer may initiate a high action level by "addressing" a golf ball. A low action level may include any actions that are not part of a high action level.

The display device 108 may be any suitable device for displaying video. For example, the display device 108 may be a television, a smart television, a computer monitor, and/or another type of display device. In some embodiments, the display device 108 may include an embodiment of the user interaction module 104. In various embodiments, the display device 108 may be one example of the information handling device 102. In certain embodiments, the display device 108 may include one or more input ports for receiving input video. For example, the display device 108 may include one or more high-definition multimedia interface ("HDMI") ports, one or more ethernet ports, one or more universal serial bus ("USB") ports, one or more video graphics array ("VGA") ports, one or more component video ports, one or more wireless ports, one or more coax cable ports, and/or one or more s-video ports.

In some embodiments, the electronic media device 110 may receive a video input at a first port; receive an indication to switch a video output between a first mode and a second mode, wherein the first mode includes the video input occupying a full display screen, and the second mode includes the video input occupying less than the full display screen; receive information corresponding to the video input, wherein, in the second mode, the information occupies a portion of the full display screen; and transmit, from a second port, the video output for displaying the video output on a display external to the electronic media device 110. In certain embodiments, the electronic media device 110 may be part of the display device 108.

In certain embodiments, the video source 112 may provide a video input to the electronic media device 110. In some embodiments, the video source 112 may be a cable box, a satellite box, the Internet, a storage device, a wired connection, a wireless connection, streaming media, and/or another video input. In various embodiments, the video source 112 may provide video directly to the display device 108.

In some embodiments, the information handling device 114 may be one embodiment of the information handling device 102. In certain embodiments, the information handling device 114 includes the control module 116. The information handling device 114 may be a server used to manage information provided to the user interaction module 104 and/or the electronic media device 110.

In certain embodiments, the control module 116 may transmit, to the electronic media device 110, an indication to switch a video output between a first mode and a second mode. In certain embodiments, the first mode includes a video input occupying a full display screen, and the second mode includes the video input occupying less than the full display screen. In various embodiments, the control module 116 may transmit, to the electronic media device 110, information corresponding to the video input. In some embodiments, in the second mode, the information occupies a portion of the full display screen. In certain embodiments, the control module 116 may transmit advertising information, data, statistics information, news information, weather information, traffic information, local events information, charity information, and/or other information to the electronic media device 110.

Figure 2:
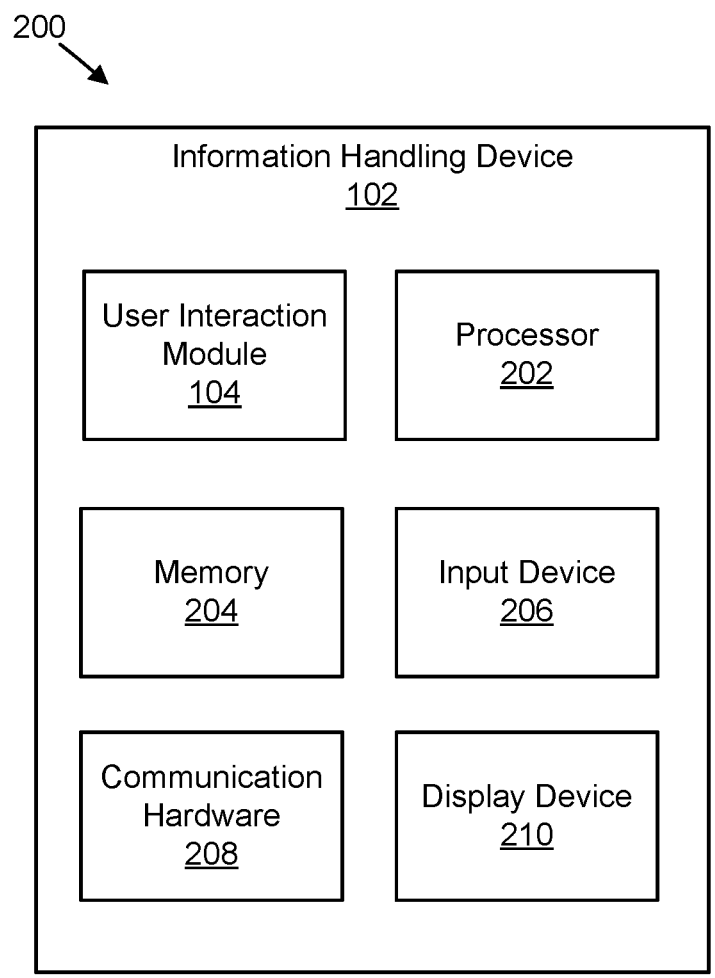
FIG. 2 is a schematic block diagram illustrating one embodiment of an apparatus including an information handling device.

FIG. 2 depicts one embodiment of an apparatus 200 that may be used for displaying video. The apparatus 200 includes one embodiment of the information handling device 102. Furthermore, the information handling device 102 may include the user interaction module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the user interaction module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the information handling device 102. In various embodiments, the memory 204 may refer to remote storage, such as cloud storage.

The information handling device 102 may use the user interaction module 104 for receiving interactive options that facilitate user selection so that the user can predict what will happen on a video source. As may be appreciated, the user interaction module 104 may include computer hardware, computer software, or a combination of both computer hardware and computer software. For example, the user interaction module 104 may include circuitry, or a processor, used to selections from a user to predict what will happen during a live event. As another example, the user interaction module 104 may include computer program code that receives interactive options that facilitate user selection.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the user interaction module 104.

Figure 3:
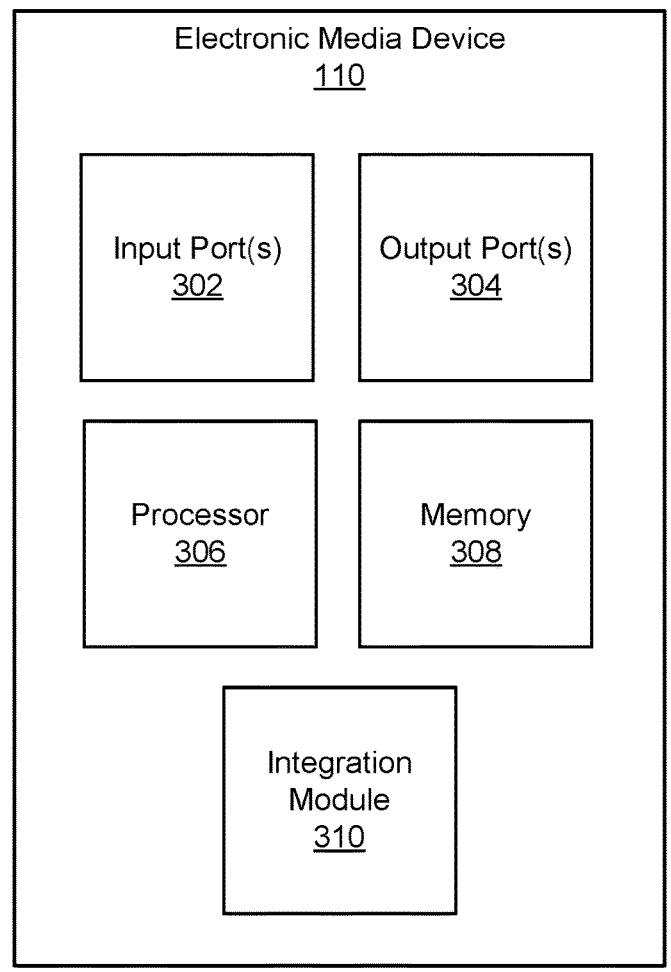
FIG. 3 is a schematic block diagram illustrating one embodiment of an apparatus including an electronic media device.

FIG. 3 depicts a schematic block diagram illustrating one embodiment of an apparatus 300 that includes one embodiment of the electronic media device 110. Furthermore, the electronic media device 110 includes one or more input ports 302, one or more output ports 304, a processor 306, memory 308, and an integration module 310. The processor 306 and memory 308 may be substantially similar to the processor 202 and memory 204 described in relation to FIG. 2. In certain embodiments, the electronic media device 110 may include any other suitable components, such as a buffer, a graphics card, and so forth.

In some embodiments, the one or more input ports 302 may be used to receive one or more video inputs, such as from a cable provider, a satellite provider, and/or a streaming media provider (e.g., via a cable box, a satellite box, the Internet, etc.). Moreover, the one or more input ports 302 may include one or more HDMI ports, one or more ethernet ports, one or more USB ports, one or more VGA ports, one or more component video ports, one or more wireless ports, one or more coax cable ports, and/or one or more s-video ports. In various embodiments, the one or more input ports 302 may receive advertising information, data, statistics information, news information, weather information, traffic information, local events information, charity information, and/or other information provided by the control module 116.

In various embodiments, the one or more output ports 304 may be used to provide one or more video outputs, such as to the display device 108. Furthermore, the one or more output ports 304 may include one or more HDMI ports, one or more ethernet ports, one or more USB ports, one or more VGA ports, one or more component video ports, one or more wireless ports, one or more coax cable ports, and/or one or more s-video ports. In some embodiments, the one or more output ports 304 may provide one or more video outputs to the display device 108 using a single port that carries video data in one or more different modes (e.g., a first mode, a second mode, etc.) as described herein.

In certain embodiments, the integration module 310 may: receive a video input at the one or more input port 302; receive an indication to switch a video output between a first mode and a second mode, wherein the first mode includes the video input occupying a full display screen, and the second mode includes the video input occupying less than the full display screen; receive information corresponding to the video input, wherein, in the second mode, the information occupies a portion of the full display screen; and transmit, from the one or more output ports 304, the video output for displaying the video output on a display external to the electronic media device 110. In various embodiments, the integration module 310 may integrate the video input with information (e.g., advertising information, data, statistics information, news information, weather information, traffic information, local events information, charity information, and/or other information) to output a single video output port (e.g., of the one or more output ports 304) for display on the display device 108.

Figure 4:
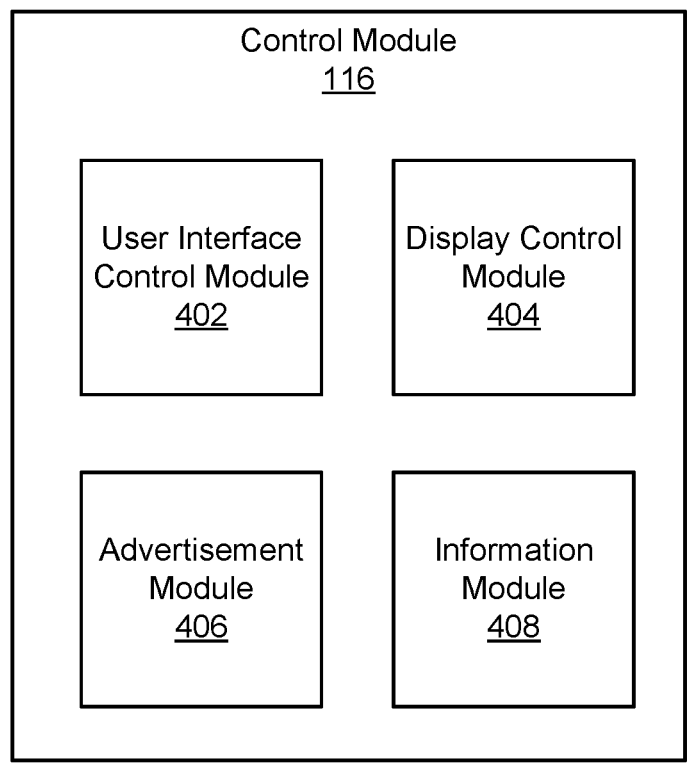
FIG. 4 is a schematic block diagram illustrating one embodiment of an apparatus including a control module.

FIG. 4 is a schematic block diagram illustrating one embodiment of an apparatus 400 that includes one embodiment of the control module 116. Furthermore, the control module 116 includes a user interface control module 402, a display control module 404, an advertisement module 406, and an information module 408.

In one embodiment, the user interface control module 402 is used to produce and/or transmit data corresponding to a live event to the user interface module 104. In certain embodiments, the user interface control module 402 is used to receive data corresponding to a live event from the user interface module 104. In various embodiments, an individual may watch a live event and determine possible selections corresponding to the live event for the user interface module 104 to provide to a user making predictions about the live event. In some embodiments, the user interface control module 402 may receive responses from multiple user interface modules 104 with data corresponding to a live event. In certain embodiments, the user interface control module 402 may transmit results of prior predictions about the live event to user interface modules 104.

In some embodiments, the display control module 404 may be used to control whether video output being provided to a display is in one of multiple different modes. For example, in one embodiment, the display control module 404 may transmit, to an electronic device (e.g., the electronic media device 110), an indication to switch a video output between a first mode and a second mode. The first mode may include a video input occupying a full display screen, and the second mode may include the video input occupying less than the full display screen. In one embodiment, the first mode may include a live event occupying a full usable space of a display screen. In some embodiments, the second mode may include a live event occupying a portion of the full usable space of a display screen, and other information occupying other portions of the full usable space. In certain embodiments, in the second mode, a live event may occupy a first portion of the full display screen, information corresponding to user predictions may occupy a second portion of the full display screen, and an advertisement may occupy a third portion of the full display screen. In various embodiments, an individual may determine a point in time to switch between different operational modes.

In various embodiments, the advertisement module 406 may be used to determine advertisements for display with the live event while in the second mode. In some embodiments, the advertisement module 406 may transmit advertisements for display with the live event. The advertisement module 406 may transmit the advertisements to the electronic media device 110 for the electronic media device 110 to combine the information with the live event for display (e.g., for display in a sidebar of a display). In some embodiments, the advertisements may be tailored to a particular user. Therefore, the advertisements may be transmitted to the electronic media device 110 corresponding to the particular user. In certain embodiments, the advertisements may be transmitted to an information handling device 102 for display via the user interaction module 104. In one embodiment, the user interaction module 104 may display a small advertisement with options for user predictions corresponding to a live event. In another embodiment, the user interaction module 104 may display a large advertisement that occupies substantially an entire display screen of the display device 210 of the information handling device 104. In various embodiments, the advertisement module 406 may transmit advertisements to a website on which standings and/or statistics corresponding to user performance in predicting live events may be accessed and/or viewed.

In certain embodiments, advertisements from the advertisement module 406 may offer viewers an incentive for making a purchase of an advertised product. For example, an advertisement may indicate that if a viewer makes a purchase, a percentage of the purchase may be donated to a charity. In some embodiments, advertisements from the advertisement module 406 may indicate to viewers that if they win a prize, something will be donated to a charity. For example, an advertisement may indicate that if a viewer wins a prize, an advertised beverage may be donated to a homeless shelter. In various embodiments, advertisements from the advertisement module 406 may indicate to viewers that advertisers may give prizes to the viewers if the viewers connect with the advertiser's brand (e.g., via social media).

In certain embodiments, the information module 408 may be used to determine which user predictions to display with a live event and/or to transmit the user predictions for display with the live event. The information module 408 may transmit the information to the electronic media device 110 for the electronic media device 110 to combine the information with the live event for display. In some embodiments, the information may be tailored to a particular user (e.g., the information may include predictions from the particular user, a score corresponding to the particular user, a ranking corresponding to the particular user). In such embodiments, the information may be transmitted to the electronic media device 110 corresponding to the particular user (e.g., scores, standings, rankings, etc.). In some embodiments, a prize may be given to a user for winning a competition, for having a certain ranking, and/or for having a certain score. In such embodiments, a user may donate their prize to a charity. In various embodiments, the information module 408 may be used to determine other information (e.g., advertising information, data, statistics information, news information, weather information, traffic information, local events information, charity information, and/or other information) to display with a live event and/or to transmit the information to display with the live event.

Figure 5:
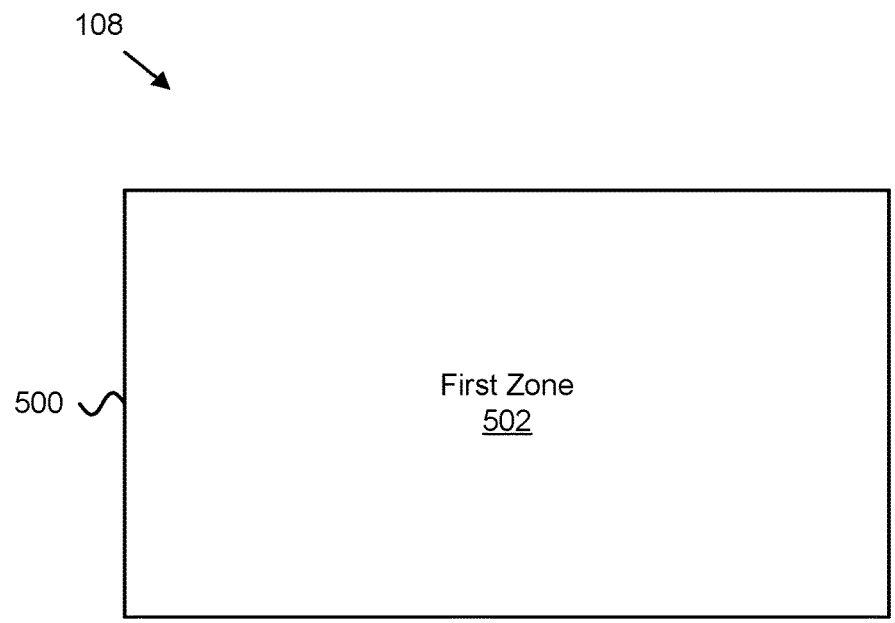
FIG. 5 is a schematic block diagram illustrating an embodiment of a display device operating in a first mode.

FIG. 5 is a schematic block diagram illustrating an embodiment of the display device 108 operating in a first mode. The display device 108 includes a screen 500 that is the part of the display device 108 that is usable for displaying video images. In the first mode, a first zone 502 occupies the entire screen 500 (e.g., a substantial portion of the entire screen 500). The first zone 502 is used to display a live event. Moreover, in the first mode, other image or video data from the electronic media device 110 may not be displayed on the screen 500. In some embodiments, the first mode may be displayed during a high action level. In certain embodiments, the first zone 502 may have a 16:9 aspect ratio.

Figure 6:
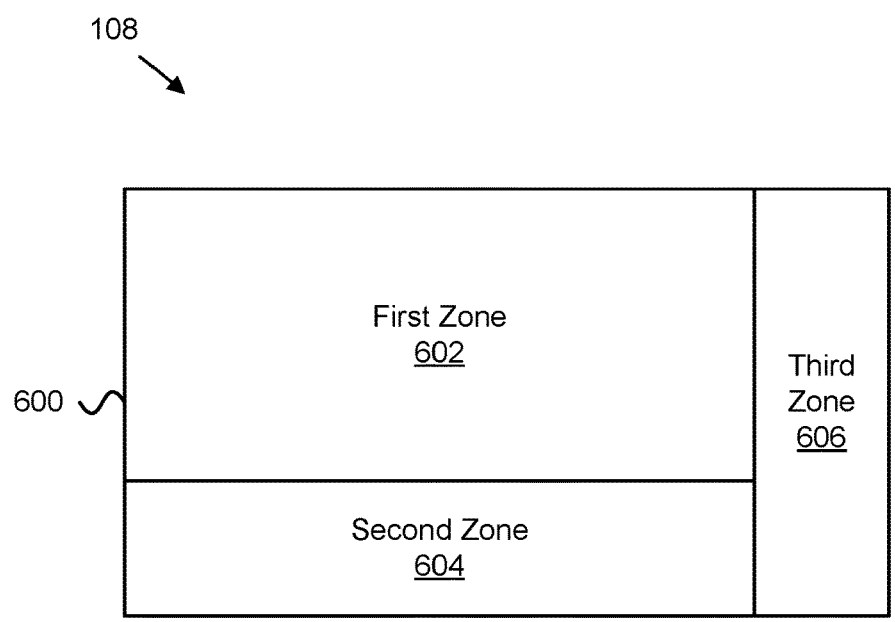
FIG. 6 is a schematic block diagram illustrating an embodiment of a display device operating in a second mode.

FIG. 6 is a schematic block diagram illustrating an embodiment of the display device 108 operating in a second mode. The display device 108 includes a screen 600 that is the part of the display device 108 that is usable for displaying video images. In one embodiment, in the second mode, a first zone 602 occupies a first portion of the screen 600, a second zone 604 occupies a second portion of the screen 600, and a third zone 606 occupies a third portion of the screen 600. As may be appreciated, in some embodiments, in the second mode, there may be two zones, or greater than three zones. Moreover, the zones may have any suitable size and/or position on the screen 600. In one embodiment, the first zone 602 is used to display a live event, the second zone 604 is used to display information corresponding to user predictions (e.g., scores, rankings), and the third zone 606 is used to display advertisements. In some embodiments, the first zone 602 is used to display a live event, the second zone 604 is used to display advertisements, and the third zone 606 is used to display information corresponding to user predictions. Moreover, in the second mode, other image or video data from the electronic media device 110 may be displayed in various zones of the screen 600. In one embodiments, animations may be displayed in any of the zones (e.g., the second zone 604, the third zone 606, etc.). In some embodiments, the second mode may be displayed during a low action level. In certain embodiments, the first zone 602 may have a 16:9 aspect ratio.

In various embodiments, the display device 108 may alternate between the first mode and the second mode. For example, a user may watch a live event in the first mode. In response to a low action level, the live event may be switched to the second mode (e.g., via a person indicating that the live event has switched to the low action level and/or via an indication sent from the control module 116 to the electronic media device 110). During the low action level, the control module 116 may determine results from a prior high action level, the control module 116 may transmit the results from the prior high action level to the electronic media device 110 and/or the user interaction modules 104 for display in the second mode, the control module 116 may transmit information corresponding to a next prediction to be made by users to the user interaction modules 104, the control module 116 may receive information corresponding to the next prediction made by the users from the user interaction modules 104, and/or the control module 116 may transmit advertisements and/or other information to the electronic media device 110 and/or the user interaction modules 104 for display in the second mode.

Figure 7:
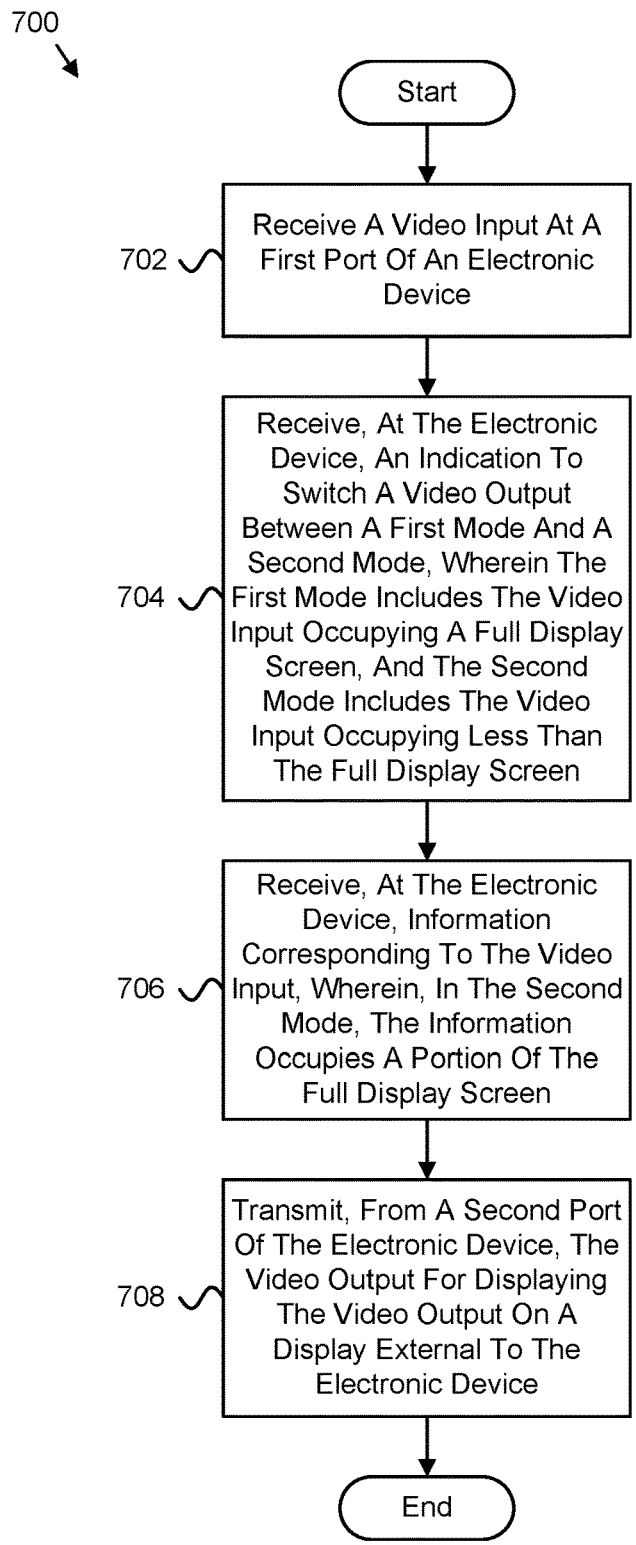
FIG. 7 is a schematic flow chart diagram illustrating an embodiment of a method for displaying video.

FIG. 7 is a schematic flow chart diagram illustrating an embodiment of a method 700 for displaying video. In some embodiments, the method 700 is performed by an apparatus, such as the electronic media device 110. In other embodiments, the method 700 may be performed by a module, such as the integration module 310. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a video input at a first port (e.g., the one or more input ports 302) of an electronic device (e.g., the electronic media device 110). In certain embodiments, the method 700 includes receiving 704, at the electronic device, an indication to switch a video output between a first mode and a second mode. In such embodiments, the first mode includes the video input occupying a full display screen, and the second mode includes the video input occupying less than the full display screen. In some embodiments, the method 700 includes receiving 706, at the electronic device, information corresponding to the video input. In various embodiments, in the second mode, the information occupies a portion of the full display screen. In certain embodiments, the information includes a user's prediction of an outcome of a sporting event, a user's prediction of a play of a sporting event, a user's prediction of a score of a sporting event, a user's selection, a user's ranking, a user's score, a question, and/or a response. In certain embodiments, the information may include advertising information, data, statistics information, news information, weather information, traffic information, local events information, charity information, and/or other information. In some embodiments, the method 700 includes transmitting 708, from a second port (e.g., the one or more output ports 304) of the electronic device, the video output for displaying the video output on a display external to the electronic device.

In some embodiments, the video input includes a video output from a cable box, a satellite box, the Internet, a storage device, a wired connection, a wireless connection, streaming media, and/or another video input. In one embodiment, the video input includes a sporting event, a live event, a political debate, a game show, a concert, and/or another event. In certain embodiments, the indication indicates to switch to the first mode in response to a sporting event having a high action level. In various embodiments, the high action level includes a time in which a sport apparatus is in play, a time in which the sport apparatus is in motion, a time in which a player is in motion, a time in which a game clock is running, and/or a time not in a huddle. In some embodiments, the indication indicates to switch to the second mode in response to a sporting event having a low action level (e.g., no action level). In one embodiment, the low action level includes a timeout, a time in which a sport apparatus is not in play, a time in which a player is not in motion, a penalty time, a clock stopping event, an injury break, a commercial break, a delay of game, and/or a time in a huddle. As used herein, a sport apparatus may be any device used as a component of a sport. For example, a sport apparatus may be a ball, a puck, a stick, a sword, a gun, a stick, a body part, or any other suitable device used to play a sport.

In various embodiments, in the second mode, the video input occupies a first portion of the full display screen, the information occupies a second portion of the full display screen, and an advertisement (or other information) occupies a third portion of the full display screen. In some embodiments, the method 700 includes receiving, at the electronic device, the advertisement (or other information).

Figure 8:
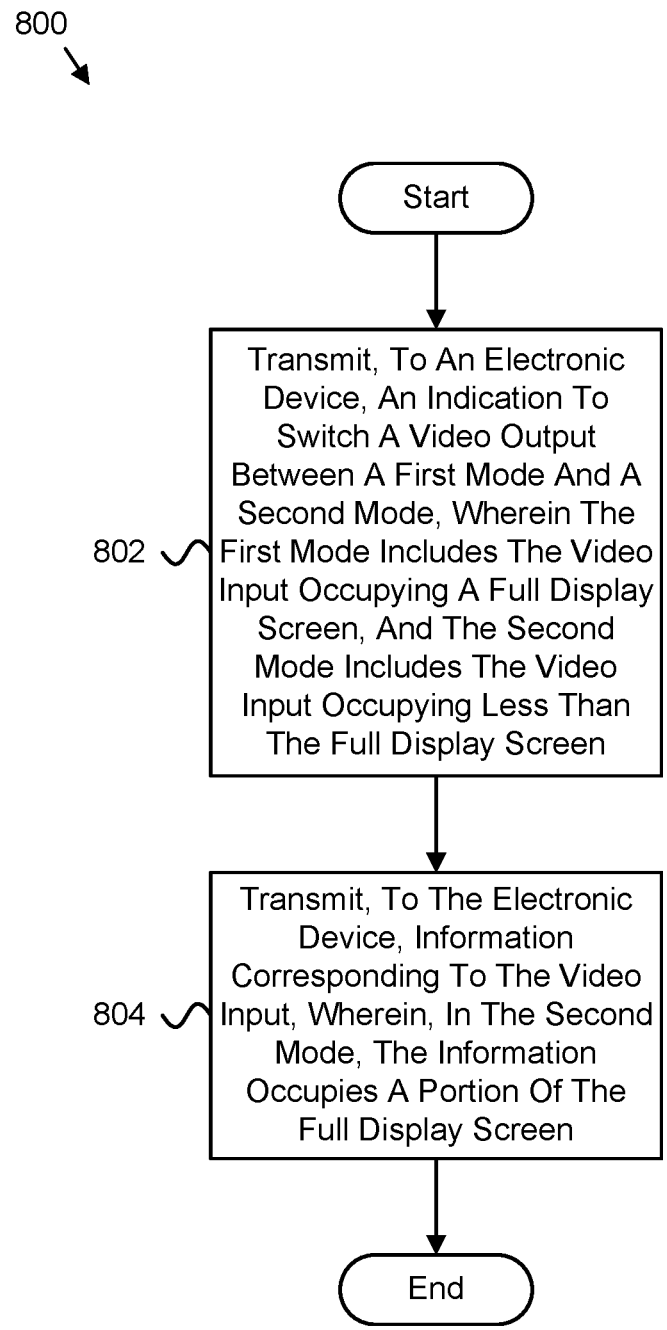
FIG. 8 is a schematic flow chart diagram illustrating another embodiment of a method for displaying video.

FIG. 8 is a schematic flow chart diagram illustrating another embodiment of a method 800 for displaying video. In some embodiments, the method 800 is performed by an apparatus, such as the information handling device 114. In other embodiments, the method 800 may be performed by a module, such as the control module 116. In certain embodiments, the method 800 may be performed by a processor executing program code, for example, a microcontroller, a microprocessor, a CPU, a GPU, an auxiliary processing unit, a FPGA, or the like.

The method 800 may include transmitting 802, to an electronic device (e.g., the electronic media device 110), an indication to switch a video output between a first mode and a second mode. In such embodiments, the first mode includes a video input occupying a full display screen, and the second mode includes the video input occupying less than the full display screen. In some embodiments, the method 800 includes transmitting 804, to the electronic device, information corresponding to the video input. In various embodiments, in the second mode, the information occupies a portion of the full display screen. In certain embodiments, the information includes a user's prediction of an outcome of a sporting event, a user's prediction of a play of a sporting event, a user's prediction of a score of a sporting event, a user's selection, a user's ranking, a user's score, a question, and/or a response. In certain embodiments, the information may include advertising information, data, statistics information, news information, weather information, traffic information, local events information, charity information, and/or other information.

In some embodiments, the video input includes a video output from a cable box, a satellite box, the Internet, a storage device, a wired connection, a wireless connection, streaming media, and/or another video input. In one embodiment, the video input includes a sporting event, a live event, a political debate, a game show, a concert, and/or another event. In certain embodiments, the indication indicates to switch to the first mode in response to a sporting event having a high action level. In various embodiments, the high action level includes a time in which a sport apparatus is in play, a time in which the sport apparatus is in motion, a time in which a player is in motion, a time in which a game clock is running, and/or a time not in a huddle. In some embodiments, the indication indicates to switch to the second mode in response to a sporting event having a low action level (e.g., no action level). In one embodiment, the low action level includes a timeout, a time in which a sport apparatus is not in play, a time in which a player is not in motion, a penalty time, a clock stopping event, an injury break, a commercial break, a delay of game, and/or a time in a huddle.

In various embodiments, in the second mode, the video input occupies a first portion of the full display screen, the information occupies a second portion of the full display screen, and an advertisement (or other information) occupies a third portion of the full display screen. In some embodiments, the method 800 includes transmitting, to the electronic device, the advertisement (or other information).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving a video input at a first port of an electronic device, wherein the video input comprises a sporting event;
receiving, at the electronic device, an indication to switch video in a video output between a first mode and a second mode, wherein the first mode comprises the video input occupying a first zone and a second zone of a display screen, the second mode comprises the video input occupying only the first zone of the display screen, the indication indicates to switch the video in the video output to the first mode in response to the video input comprising a high action level, the indication indicates to switch the video in the video output to the second mode in response to the video input comprising a low action level, and wherein:
the high action level comprises a time in which a sport apparatus is in play, a time in which the sport apparatus is in motion, a time in which a player is in motion, a time in which a game clock is running, a time not in a huddle, or some combination thereof; and
the low action level comprises a timeout, a time in which a sport apparatus is not in play, a time in which a player is not in motion, a penalty time, a clock stopping event, an injury break, a commercial break, a delay of game, a time in a huddle, or some combination thereof;
receiving, at the electronic device, information related to the video input while the video in the video output is in the second mode, the information occupies the second zone of the display screen, the second zone does not overlap the first zone, and the information comprises a user's prediction, a user's ranking, a user's score, or some combination thereof; and
transmitting, from a second port of the electronic device, the video in the video output and the information for displaying the video and the information on the display screen of a display external to the electronic device.

2. The method of claim 1, wherein the video input comprises an output from a cable box or a satellite box.

3. The method of claim 1, wherein the indication indicates to switch to the first mode in response to the sporting event having the high action level.

4. The method of claim 1, wherein the indication indicates to switch to the second mode in response to the sporting event having the low action level.

5. The method of claim 1, wherein, while the video in the video output is in the second mode, an advertisement occupies a third zone of the display screen.

6. The method of claim 5, further comprising receiving, at the electronic device, the advertisement.

7. The method of claim 1, wherein the information comprises the user's prediction of an outcome of a sporting event, the user's prediction of a play of a sporting event, the user's prediction of a score of a sporting event, or some combination thereof.

8. An electronic device comprising:
a first port;
a second port;
a processor; and
a memory that stores code executable by the processor to:
receive a video input at the first port, wherein the video input comprises a sporting event;
receive an indication to switch video in a video output between a first mode and a second mode, wherein the first mode comprises the video input occupying a first zone and a second zone of a display screen, the second mode comprises the video input occupying only the first zone of the display screen, the indication indicates to switch the video in the video output to the first mode in response to the video input comprising a high action level, the indication indicates to switch the video in the video output to the second mode in response to the video input comprising a low action level, and wherein:
the high action level comprises a time in which a sport apparatus is in play, a time in which the sport apparatus is in motion, a time in which a player is in motion, a time in which a game clock is running, a time not in a huddle, or some combination thereof; and
the low action level comprises a timeout, a time in which a sport apparatus is not in play, a time in which a player is not in motion, a penalty time, a clock stopping event, an injury break, a commercial break, a delay of game, a time in a huddle, or some combination thereof;
receive information related to the video input while the video in the video output is in the second mode, the information occupies the second zone of the display screen, and the second zone does not overlap the first zone, and the information comprises a user's prediction, a user's ranking, a user's score, or some combination thereof; and
transmit, from the second port, the video in the video output and the information for displaying the video and the information on the display screen of a display external to the electronic device.

9. The electronic device of claim 8, wherein the video input comprises an output from a cable box or a satellite box.

10. The electronic device of claim 8, wherein, while the video in the video output is in the second mode, an advertisement occupies a third zone of the display screen.

11. The electronic device of claim 8, wherein the information comprises the user's prediction of an outcome of a sporting event, the user's prediction of a play of a sporting event, the user's prediction of a score of a sporting event, or some combination thereof.

* * * * *